United States Patent [19]

Politi et al.

[11] Patent Number: 5,018,552
[45] Date of Patent: May 28, 1991

[54] VALVE ASSEMBLY FOR PACKING FLUID UNDER PRESSURE AND PACKING PROVIDED WITH SUCH ASSEMBLY

[75] Inventors: Jean-Marie Politi, Pontault Combault, France; Lennart Franz, Malmo, Sweden

[73] Assignee: L'Air Liquide, Societe Anonyme Pour L'Etude et L'Exploitation des Procedes Georges Claude, Paris, France

[21] Appl. No.: 530,289

[22] Filed: May 29, 1990

[30] Foreign Application Priority Data

May 29, 1989 [FR] France ............................. 89 06983
Dec. 20, 1989 [FR] France ............................. 89 16870

[51] Int. Cl.$^5$ ............................................. F16K 51/00
[52] U.S. Cl. .............................. 137/614.11; 222/147; 141/18
[58] Field of Search ............. 251/89; 137/316, 614.11, 137/614.2; 141/18, 21; 222/147

[56] References Cited

U.S. PATENT DOCUMENTS 2,019,251 10/1935 Cooke .
2,626,723 1/1953 Omorats ........................... 222/147 X
2,828,054 3/1958 Cliarmonte ....................... 222/147 X

FOREIGN PATENT DOCUMENTS 0008662 3/1980 European Pat. Off. .
299280 4/1916 Fed. Rep. of Germany .
1750574 1/1972 Fed. Rep. of Germany .
1106037 12/1955 France .

Primary Examiner—John C. Fox
Attorney, Agent, or Firm—Young & Thompson

[57] ABSTRACT

The valve assembly for non-returnable packing comprises a valve housing including a main valve and an auxiliary valve the latter being initially kept in opened position through a resilient locking device which is unlocked, at the end of a first filling through a displacement of the main valve beyond its position of normal opening under the action of a long travel filling tap. The auxiliary valve is then forced to rest on its seat by means of a spring with low calibration. Any depression caused by tapping would provoke the opening of the auxiliary valve, while any overpressure resulting from filling would hit the auxiliary valve in a closed position.

10 Claims, 5 Drawing Sheets

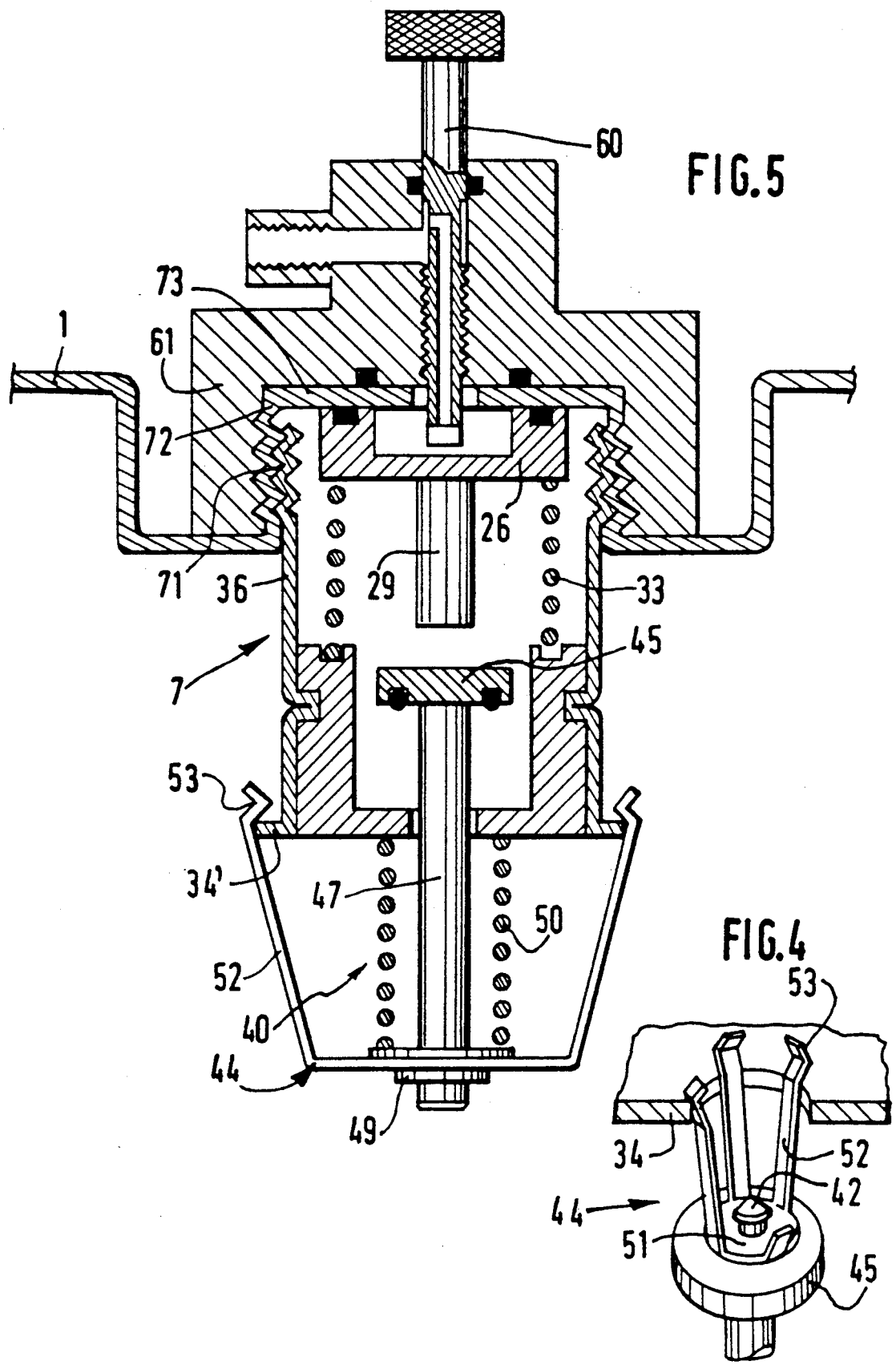

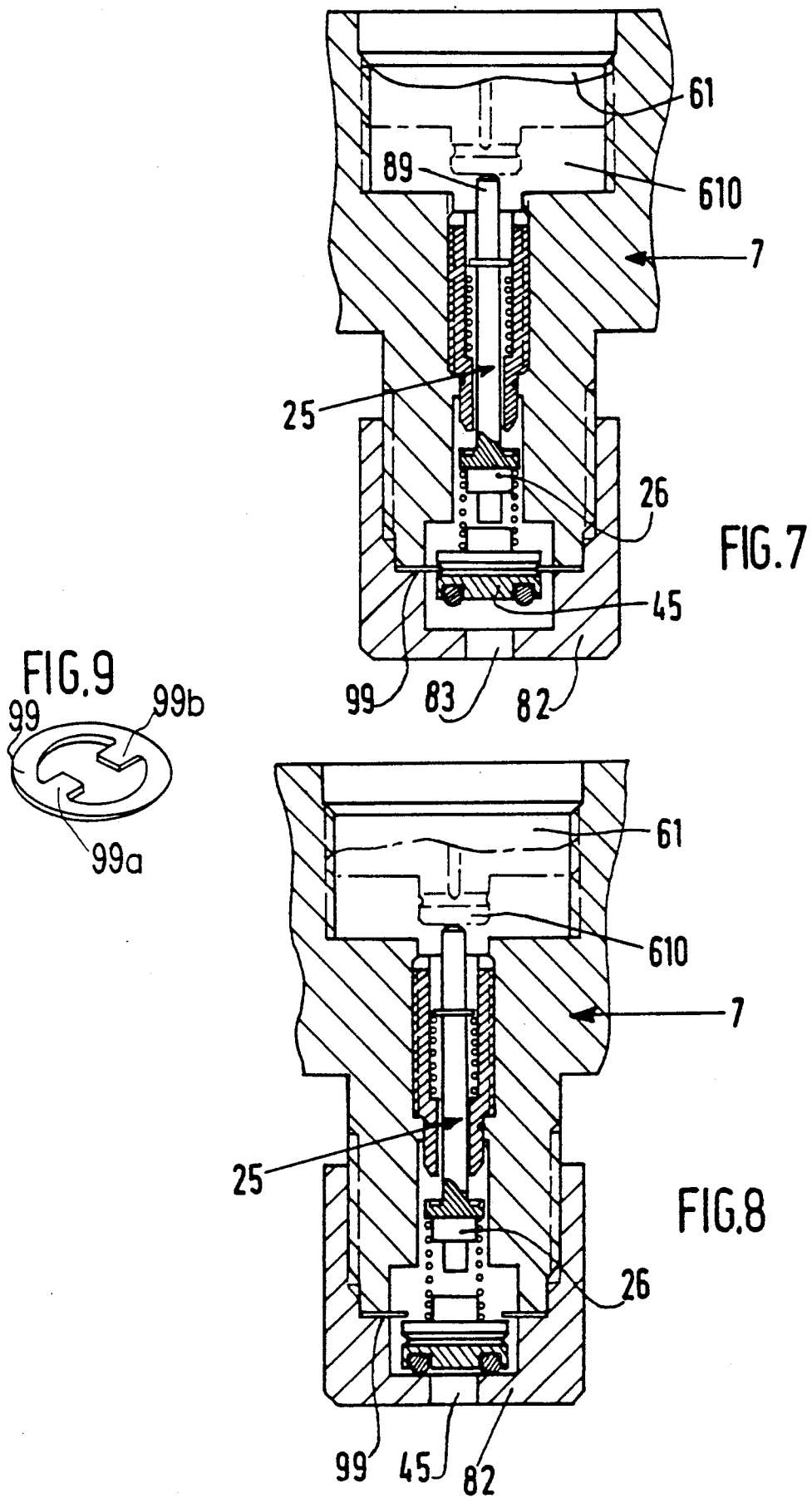

5,018,552

VALVE ASSEMBLY FOR PACKING FLUID UNDER PRESSURE AND PACKING PROVIDED WITH SUCH ASSEMBLY

BACKGROUND OF INVENTION (a) Field of the Invention

The present invention concerns a valve assembly for non-returnable packing or non-rechargeable container, of the type comprising a valve housing including a main valve forced into closing by means of a first return spring, and capable of cooperating with a means of operating the valve against the action of the spring.

(b) Description of Prior Art

The increasingly frequent use of light packings which should only be filled once, so called non-returnable packings, raises safety problems with respect to their eventual reuse which is prohibited, especially since, in certain cases, the pressures use can be high.

To remove the possibility of some later filling by a user who is not aware of the law or of the dangers associated with such an operation, the invention proposes a new valve assembly whose structure is simple and compact, of low manufacturing cost, exclusively permitting the initial filling of the packing and preventing without any doubt any new filling subsequent to an at least partial emptying of the packing.

SUMMARY OF INVENTION

This object according to the invention is achieved by providing in the housing, an auxiliary valve which is in series with the main valve and is urged into closing by means of a second low calibration spring and is initially maintained in opening position through a locking means which is initially set in locking position and is displaceable into a definite unlocking position by the main valve when a pronounced opening is exerted on the main valve beyond its normal opening travel.

With this arrangement, after having proceeded, at the plant station, to the known filling of a packing with a liquid and/or gas, it is only necessary to produce a more pronounced displacement of the main valve to achieve the unlocking of the auxiliary valve which will adopt a closing position under the action of the second spring. It will be understood that a subsequent drawing off is quite possible, since the auxiliary valve opens under the action of the initial drawing off depression because of the internal pressure in the packing, but that on the contrary, it will remain in closed position if one tries to fill the packing, because of the effect of the second spring which is reinforced by the external pressure during a second attempt of refilling.

According to a more specific characteristic of the invention, the main and auxiliary valves are mounted coaxially with respect to the locking means which consists of a member with resilient lugs capable of enabling engagement between the auxiliary valve and the housing of the valve.

BRIEF DESCRIPTION OF DRAWINGS

Other characteristics and advantages of the invention will appear from the description which follows of embodiments given by way of examples, with reference to the annexed drawings, in which:

FIG. 1, ready for loading; FIG. 2, during loading; FIG. 3: at the end of loading and during drawing off.

FIG. 4 is a perspective view of the locking member of FIGS. 1 to 3;

FIG. 5 is a view similar to FIG. 1, of a second embodiment;

FIGS. 6 to 8 are views similar to FIGS. 1 to 3, of a third embodiment;

FIG. 9 is a perspective view of the locking member of FIGS. 6 to 8.

DESCRIPTION OF PREFERRED EMBODIMENTS

Figure 1:
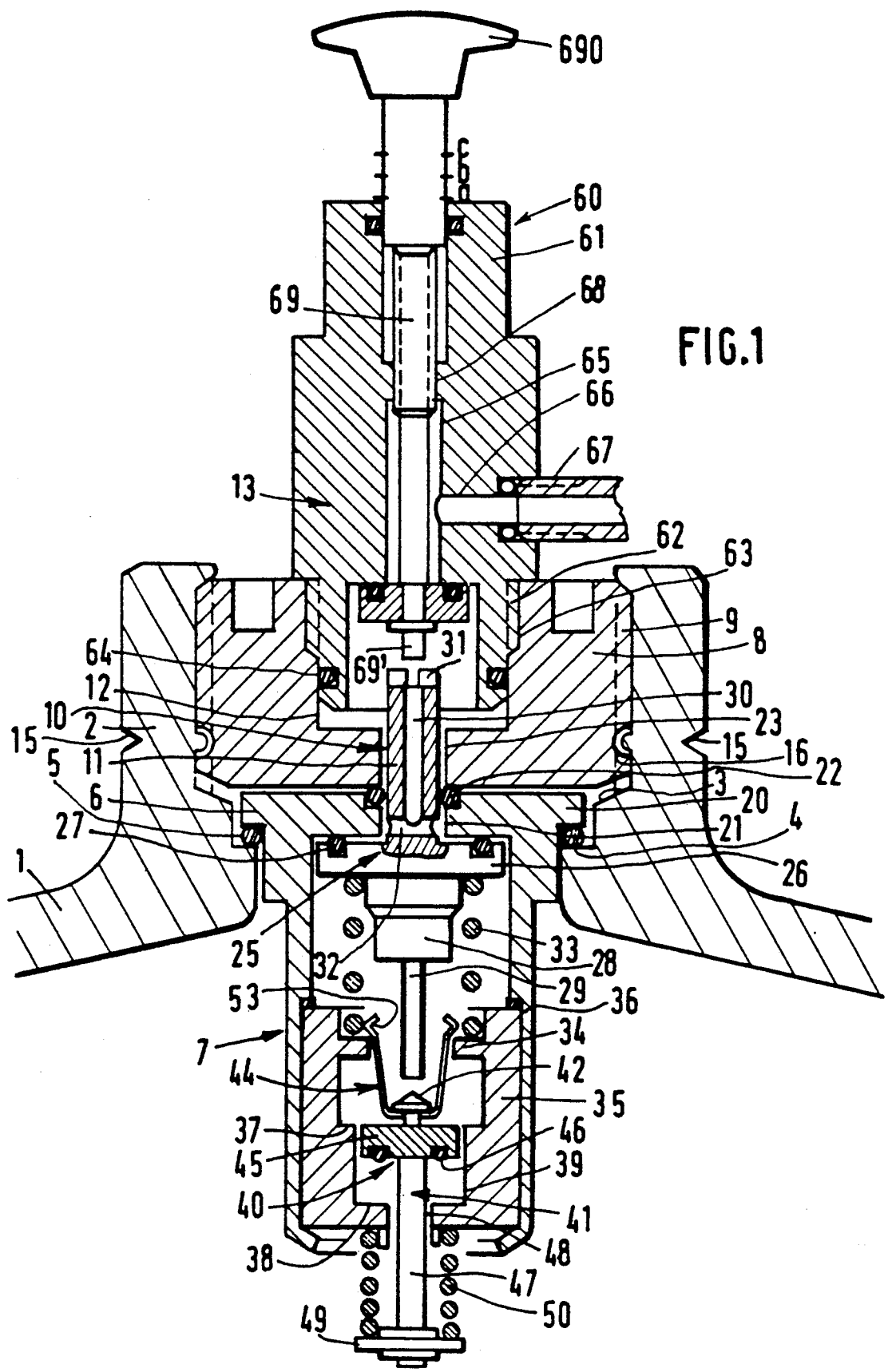
FIGS. 1 to 3 are cross-section views of a first embodiment of valve assembly in the following positions.
Figure 2:
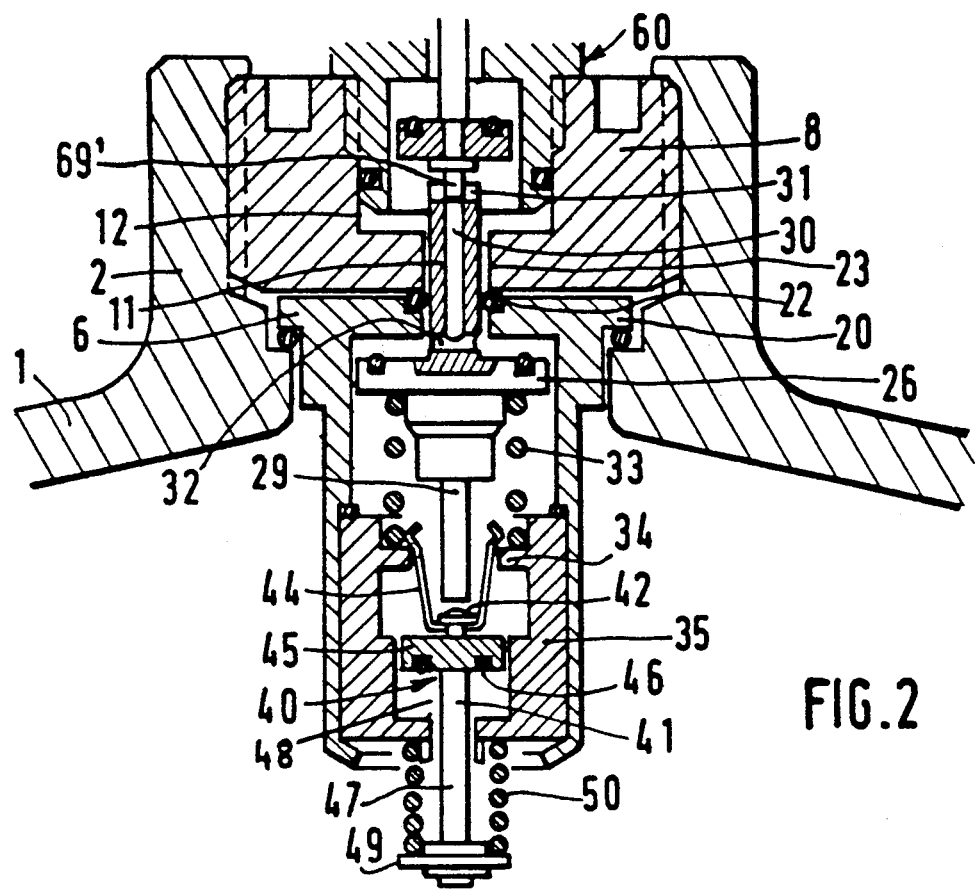
Figure 3:
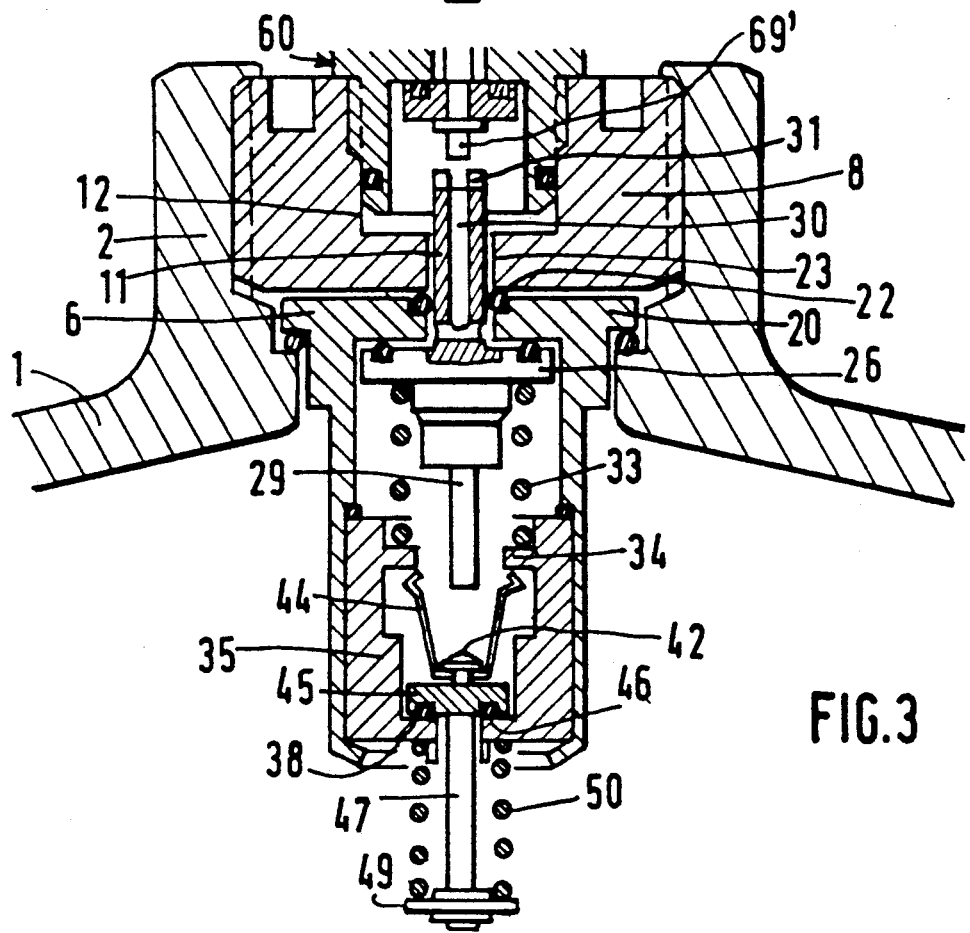

With reference to FIGS. 1 to 3, a fluid container under pressure of the non-returnable type comprises a bottle body 1 with a neck 2 having two consecutive inner annular shoulders 3 and 4. The deeper shoulder 4 serves to sealingly support a housing of a tubular valve 7, by means of a widened edge 6 and a seal 5, said housing being kept in position in the neck 2 by means of a plug 8 screwed at 9 in the neck 2, and having a central opening 10 allowing the passage of a tubular valve head 11 and a recess 12 for mounting a tap 13. The assembly is made undismantable and impervious by crimping (at 14) the end of the neck 2 on the plug 8 and/or by driving in, with punch blows 15, the wall of the neck 2 in a peripheral channel 16 of the plug 8.

Through its axial end wall 20, the valve housing 7 has an opening 21 enabling the passage of the valve head 11 with a seal 22 placed in between, said seal being positioned in wall 20 of housing 7. Valve head 11 constitutes an extension projecting outside valve housing 7 of a main valve, so called filling-tapping valve 25 made of a movable part, including, in addition to valve head 11, a main filling-tapping valve 26 provided with a seal 27 cooperatively acting as a closing support against wall 20 about opening 21, a valve body 28 and a stem 29. Valve head 11 presents an axial duct 30 outwardly opening at a free end which is provided with studs 31, and inwardly through radial ducts 32 located immediately above valve 26. A compression spring 33 is engaged around valve body 28 and is supported, between valve 36 and an inner shoulder 34, in the housing 7. This shoulder 34 is advantageously constituted of a bottom member 35 set in an envelope 36 of the valve housing 7. Bottom member 35 additionally has two consecutive shoulders 37 and 38 and a cylindral bearing 39 for the free guiding of an auxiliary valve 40, so called filling-prevention valve, formed of a movable part 41, having a holding head 42 for holding or resilient locking member 44 of the movable part 41, a valve 45 with lower seal 46 and a stem 47 projecting through a duct 48 to end in a holding ring 49 of a compression spring 50 with low calibration thrust against the external front face of the bottom member 35.

The resilient holding member 44 is formed of an annular body 51 from which extend three or four lugs in the form of blades 52 each terminating in a bent finger 53.

Initially, during manufacture, the lugs 52 are all engaged through the opening defined by the shoulder 34 until the bent fingers are resiliently locked above shoulder 34 which corresponds to the cocked position in locked opening of the auxiliary valve 45.

The valve housing 7 which has just been described, once mounted on a bottle 1 by means of the plug 8 is provided, at the filling station, with a filling tap 60 wherein the body 61 is screwed at 62 in an inner thread 63 of the plug 8 with a seal joint 64 in between. A tap rod 69 with operating button 690 is screwed at 68 in an axial duct 65 of the tap body 61 which outwardly communicates with a lateral duct 66 having a connection 67. The tap rod 69 has an axial projection which is sufficiently long to adopt the three consecutive positions referred to by the indications a (maximum exit position of rod 69), b (slight depression of rod 69) and c (maximum pressure of rod 69). In position a, the free end 69' of rod 69 is near to the end of the head 11 of the movable part 25 of the main valve 26, and valve 26 is therefore in sealing closure engagement, while the auxiliary valve 45 is kept in opening position by means of locking member 44.

A source of compressed gas is then hooked on connection 67 and tap rod 40 is operated until reaching depression mark b in which position the movable part 25 is slightly displaced so as to free the main valve 26 from its seat 20, without by doing this causing the stem 29 to abut against head 42 of the movable part of the auxiliary valve 45, which therefore remains in open locked position. Gas under pressure can then be introduced into the bottle through ducts 30, 32 and 48 (see FIG. 2).

At the end of the filling operation, the tap rod 69 is operated by means of button 690 so as to produce a maximum depression thereof (mark c), which causes the stem 29 of the main valve 26 to rest in thrust position against head 42 of the auxiliary valve 40 so as to induce a definite and non-resettable unlocking of the holding means 44 by forcing the lugs 53 out of engagement with shoulder 34. The auxiliary valve 45 is then immediately moved towards its closing position (FIG. 3) under the action of the spring 50, since the same pressure resides on both parts of this valve 45. The tap 60 is thereafter closed again by causing the rod 69 to climb again (FIG. 3).

After that, the source is disconnected and the tap 60 is removed by unscrewing. The packing is ready to be stored and/or shipped to the user.

At the location of use, a known tap is positioned, which however has only two positions opening and closing. Any opening thrust on the valve 26 produces a gaseous tapping and, as a result of the lowering of the pressure downstream of the auxiliary valve 45, there is an immediate opening of the valve 45 which thus frees some gas from the bottle.

At the end of the tapping operation, the auxiliary valve 45 stops rising and therefor remains in closing position on its seat 38 under the action of the compression spring 50.

In this embodiment, any attempt of refilling by the user is bound to end in failure. Even when using the special three-way tap 60 of the filling station, the auxiliary valve 55 remains permanently in closing position on its seat 38 and any arrival of gas can only reinforce this closing position. The packing is therefore undoubtedly non-reusable.

A variant of the embodiment of FIGS. 1 to 4 has been represented in FIG. 5.

The valve housing 7 is mounted here by simple screwing or setting at 71 inside a stamped collar 72 of a packing cover 1, after which the end of the collar is bent at 73 to enclose the valve housing 7. Tap 60 for the controlled opening of the main valve 26 and for unlocking the auxiliary valve 45 is mounted by screwing tap body 61 outside collar 72. The auxiliary valve 45 is here locked with a holding means 44 located outside the valve housing 7 and made unitary with part 50 of the auxiliary valve by being pinched between ring 49 and spring 50. The plugs 53 rest here on an outer collar 34' at the lower end of the housing 7. The stem 29 of the equipment of the main valve 26 is here bulkier and rests directly on the auxiliary valve 45.

Figure 6:
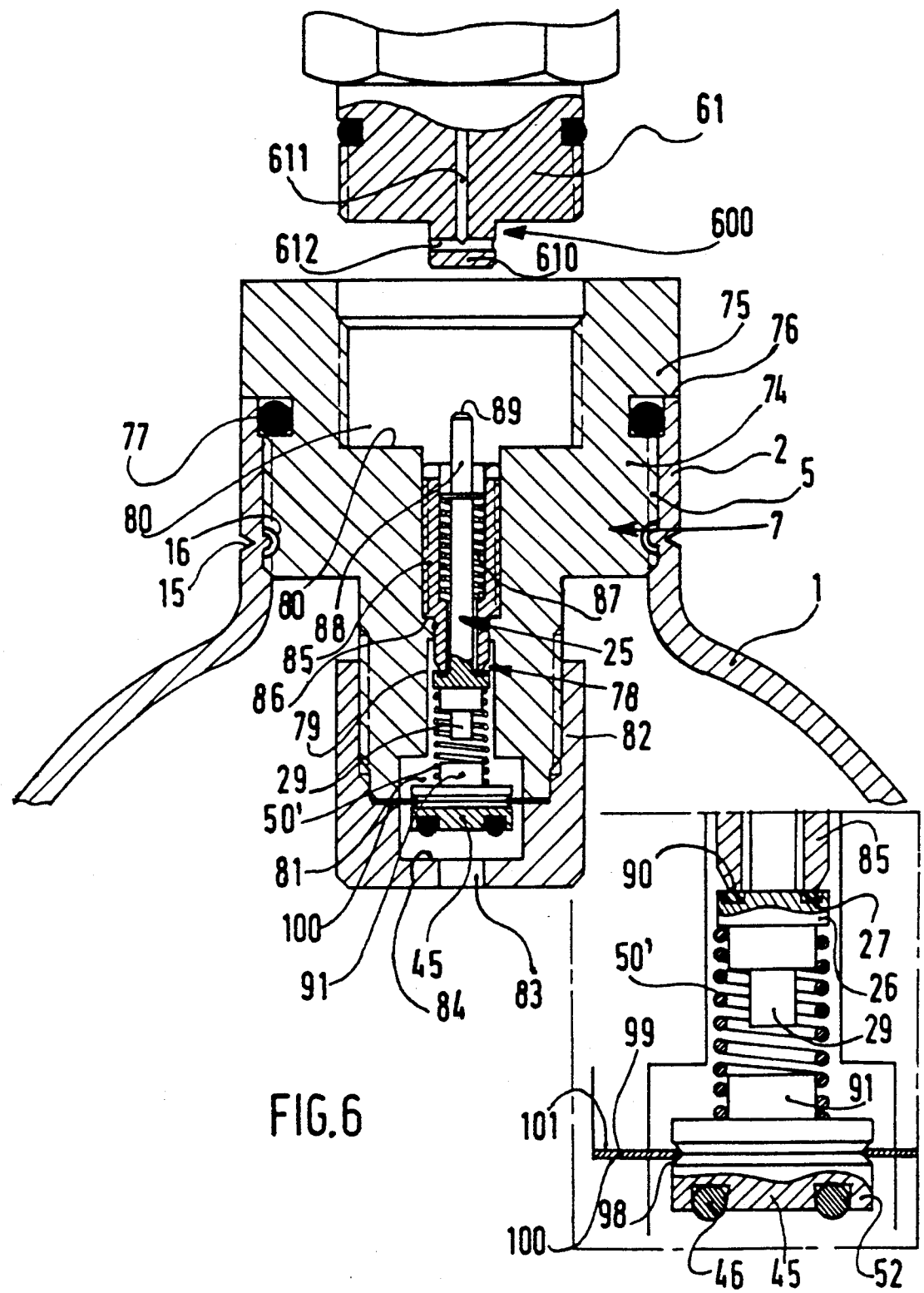

With reference to FIGS. 6 to 8, a bottle 1 with a neck 2 is provided with a valve housing 7 having a body 74 screwed inside collar 2 until it rests tightly against an upper edge 75 on the portion 76 of the bottle neck 2 with a seal joint 75 in between, the entire assembly being made nondismountable by means of punch marks 15 on the neck opposite groove 16.

Body 74 has a central axial duct 78 with a central part 79 defining a recess for the equipment of the main body 25, an upper portion of enlarged diameter 80 with internal abutting shoulder 80' for a filling-tapping tap 600, and a lower widened part forming a recess 81 for the auxiliary valve 45, this recess 81 being closed by means of a screwed cap 82 having a throughgoing duct 83 on the lower side, preceded by a wide internal shoulder 84.

The main valve 25 has a valve body 85 screwed in an intermediate portion of the central duct 78 until abutting on an internal shoulder 86. This valve body 85 defines an axial duct with an internal abutting shoulder for a compression spring 87 resting on the other hand on a collar upstream of a valve rod 88 having an upper operating projection 89 and a lower stem 29 constituting an extension of the main valve 26, which incorporates an annular joint 27 to operatively engage with the lower seat forming the front end 90 of the valve body 85. The stem of the valve 29 is opposite the auxiliary valve 45 which is itself formed of an extension 91 forming a mounting stud for a compression spring 50', with low calibration, disposed between valves 26 and 45.

The annular joint 46 of the auxiliary valve 45 is adapted to sealingly rest against shoulder 84 to form a seat around the central duct 83 at the bottom of cap 82.

The auxiliary valve 45 has a peripheral groove 98 for the provisional holding of the auxiliary valve 45 in locked position when spaced from the seat 84, which is made possible by means of a flexible annular disk 99 comprising at least two, typically three lugs 99a and 99b radially directed towards the inside and engaged in groove 98 and whose outer periphery is sealingly pinched between an internal shoulder 100 of the cap 82 and the lower front edge of the body of housing 7.

As previously mentioned, the filling-tapping device 600 has a body 61 adapted to be screwed in recess 80, with a lower axial protuberance 610 and an axial duct 611 outwardly opening through radial ducts 612.

Before a first filling, body 61 is screwed to an intermittent position (FIG. 7) where the protuberance 610 has come to rest on the extension 89 of the main valve downwardly pushing the main valve rod 88 and freeing the main valve 26 from its seat 90.

In this intermediate position, the lower stem 29 of the main valve 26 is not yet in contact with the extension of the auxiliary valve 45 which is kept locked in opened position by means of the disk 99. Loading can then take place, the two main and auxiliary valves 26 and 45 being both in opened position. As soon as loading is over, a more extended screwing of body 61 (FIG. 8) is carried out, so that the stem 29 is in thrust contact with the extension 91 of the auxiliary valve 45. Beyond an axial position of a maximum deformation, the lugs of the holding disk 99 exit from the groove 98 and the auxiliary valve 45 is definitely unlocked, to rest against seat 84 under the effect of the spring 50', and allow transit through the duct 83 only in the direction of tapping of the content of packing 1.

We claim:

1. Valve assembly for fluid container (1) under pressure of the type comprising a valve housing (7) including a main valve (26) urged into closing position by means of a first return spring (33;87) and capable of cooperating with means (690;600) for operating the main valve against the action of the first spring, which comprises an auxiliary valve (45) disposed in said housing (7), in series with the main valve (26), said auxiliary valve being drawn into closing position by means of a second low calibration spring (50;50') and initially maintained in opening position by a locking means (44;99) initially loaded in locked position and displaceable towards a final unlocked position by the main valve (26), during a pronounced opening action exerted by the activating means (690;600) on the main valve beyond its normal opening travel.

2. Valve assembly according to claim 1, wherein the main (26) and auxiliary (45) valves are coaxially mounted with the locking means consisting of a member (44;99) with resilient lugs (52;99a;99b) disposed in resilient cooperative engagement between the auxiliary valve (45) and the housing (7), the main valve (26) having an extension (29) directed towards the auxiliary valve, which is adapted to cooperate in axial thrust with the auxiliary valve.

3. Valve assembly according to claim 2, wherein the locking means (44) is dependent on the auxiliary valve (45), the resilient lugs (52) having free ends (53) operatively connected with an anchoring edge (34;34') associated with the housing (7).

4. Valve assembly according to claim 3, wherein the locking means (44) is mounted in the valve housing (7) between the main valve (25) and the auxiliary valve (45), the anchoring edge being formed by an internal radial extension (34) of the housing.

5. Valve assembly according to claim 3, wherein the locking means (91) is disposed outside the valve housing (80), the anchoring edge being formed by an external radial extension (34') of the housing.

6. Valve assembly according to claim 2, wherein the locking means (99) is associated with the valve housing (7), the resilient lugs (99a;99b) having free ends operatively connected with the auxiliary valve (45).

7. Valve assembly according to claim 6, wherein the locking means (99) comprises an annular member containing at least two lugs (99a;99b) radially outwardly extending and whose ends are received in a peripheral groove (98) of the auxiliary valve (45).

8. Valve assembly according to claim 6 wherein the second spring (50') is disposed between the main (26) and auxiliary (45) valves.

9. Valve assembly according to claim 1 wherein the valve housing (7) comprises a body (74), associated with the container (1) and including a stepped axial duct (78) defining a recess for the main valve (26), and a cap (82) defining a recess and a seat (84) for the auxiliary valve (45).

10. Fluid packing under pressure, which is provided with a valve assembly according to claim 1.

* * * * *